United States Patent [19]

Ando

[11] Patent Number: 4,783,589
[45] Date of Patent: Nov. 8, 1988

[54] FOCUS AND TRACKING DETECTION APPARATUS FOR OPTICAL HEAD EMPLOYING LIGHT GUIDE MEANS HAVING DIFFERENT RADII OF CURVATURE

[75] Inventor: Hideo Andō, Kawasaki, Japan

[73] Assignee: Kabushiki Kaisha Toshiba, Kawasaki, Japan

[21] Appl. No.: 935,348

[22] Filed: Nov. 26, 1986

[30] Foreign Application Priority Data

Nov. 30, 1985 [JP] Japan ............................. 60-269649
Jan. 16, 1986 [JP] Japan ................................ 61-6911

[51] Int. Cl.$^4$ .................. G11B 5/09; 250 201 DF; 250 204; 250 216; 250 570
[52] U.S. Cl. ........................................ 250/201; 369/45
[58] Field of Search ................................. 369/44–46; 356/125, 126

[56] References Cited

U.S. PATENT DOCUMENTS

| | | | |
|---|---|---|---|
| 4,079,248 | 3/1978 | Lehureau et al. | ................... 250/201 |
| 4,612,437 | 9/1986 | Ohsato | ..................... 250/201 DF |
| 4,654,519 | 3/1987 | Ando | ..................... 369/45 |
| 4,687,917 | 8/1987 | Kusaka et al. | .................... 354/408 |

FOREIGN PATENT DOCUMENTS

57-46334  3/1982  Japan .
58-12146  1/1983  Japan .
60-57548  4/1985  Japan .

Primary Examiner—David C. Nelms
Assistant Examiner—Stephone B. Allen
Attorney, Agent, or Firm—Finnegan, Henderson Farabow, Garrett & Dunner

[57] ABSTRACT

In an optical head, a laser beam L emitted from a semiconductor laser is collimated by a collimator lens and is incident on a beam splitter. The laser beam passing through the beam splitter is and a quarter wave plate converged by an objective lens onto an optical disk and reflected by the optical disk. The reflected laser beam passing through the objective lens and the quarter wave plate is returned to the beam splitter and is reflected from a polarizing surface of the splitter. The reflected laser beam is guided to a beam emerging surface of the prism, the surface being defined by a flat surface and a semicylindrical concave surface. The laser beam is separated at the surfaces and converged by a projection lens onto a photodetector.

20 Claims, 6 Drawing Sheets

FOCUS AND TRACKING DETECTION APPARATUS FOR OPTICAL HEAD EMPLOYING LIGHT GUIDE MEANS HAVING DIFFERENT RADII OF CURVATURE

BACKGROUND OF THE INVENTION

The present invention relates to an optical head for applying a focused light beam to an information memory medium, thereby recording or retrieving information optically.

Apparatuses and information memory media have recently been developed which are used to record or retrieve information optically. The memory media include compact disks for DAD, video disks, optical cards, or other retrieval-only memory media. The media further include those information memory media for document files, computer output memories, etc., which are used for recording and retrieval only, or which permit recording, retrieval, and erasure of information. These optical information recording/retrieving apparatuses incorporate an optical head, which applies a light beam to an information memory medium, thereby optically recording on or retrieving information from the medium. In this optical head, a laser beam emitted from a semiconductor laser (light source) is focused on the memory medium by an objective lens, and the reflected beam from the medium passes again through the objective lens, and is then detected by a photodetector. A detection signal is processed and converted into an information signal. In the optical head of this type, the light transmitted through the objective lens must be focused exactly on a record film of the information memory medium, and a tracking guide of the medium must be traced by the focused laser beam. To attain this, the optical head is provided with a focusing servo loop to detect and maintain a focusing state of the objective lens, and a tracking servo loop for detecting the tracking guide, and continually directing the objective lens toward a desired track.

The focusing state of the objective lens may be detected by the knife-edge method, as stated in U.S. Pat. Nos. 4,517,666; 4,546,460; 4,585,933 and 4,521,680 (by Ando). The tracking guide may be detected by a method such that a diffraction component diffracted by the tracking guide is detected, as stated also in the aforesaid U.S. patents. According to optical heads disclosed in these patents, a light shielding plate or a so-called knife edge is located on the optical path. The knife edge must be positioned with high accuracy, and use of it increases the number of components that must be assembled. Thus, the assembly and adjustment require a lot of time, and the resulting optical system is inevitably large-sized.

To cope with these problems, improved optical systems have been proposed in U.S. Pat. No. 4,654,519, and U.S. Pat. Appl. Ser. No. 862,829, filed on May 13, 1986 (both by Ando). In the systems disclosed in these applications, a prism is used as a beam splitter, which has a pair of beam-emerging surfaces, relatively inclined and bonded to each other on a boundary line. In these systems, one of the beam-emerging surfaces serves as a knife edge. A light beam emerging from the other emerging surface is directed to a photodetector for focusing detection, while a light beam emerging from the first emerging surface is directed to a photodetector for tracking-guide detection, located within a plane different from that of the focusing-detection photodetector. Signals from the photodetectors are processed into focusing and tracking signals. Not provided with any light shielding plate, the proposed systems are advantageous in that their components are relatively few, and can be assembled and adjusted with ease. Since the photodetectors for focusing detection and tracking-guide detection are arranged separately, however, the prior art optical systems are still complicated in structure, bulky, and heavy in weight.

SUMMARY OF THE INVENTION

The object of the present invention is to provide an optical head, which is simple in construction, requiring only a relatively small number of components, and thus permitting reduction in size and weight.

According to the present invention, there is provided an optical system for use with an optical memory, which comprises means for directing a light beam to the optical memory; means for separating the resultant light beam, received from the optical memory, into first and second light beams, the separating means including first and second light beam-emerging surfaces from which the first and second light beams emerge, the first and second light beam-emerging surfaces having different radii of curvature; and means for detecting the first and second light beams.

DETAILED DESCRIPTION OF THE PREFERRED EMBODIMENTS

Figure 1:
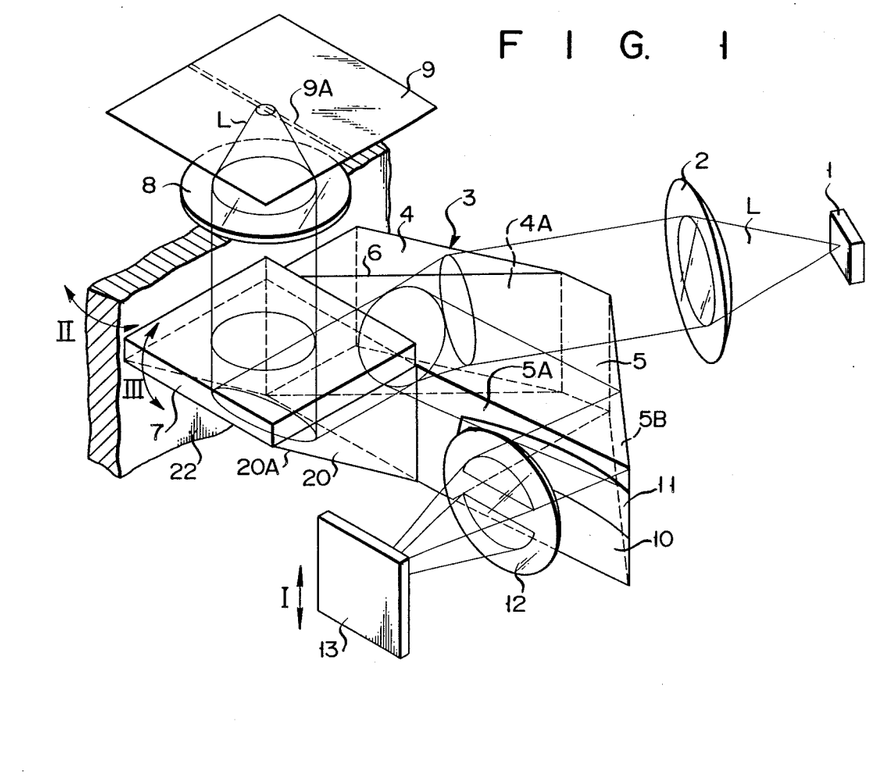
FIG. 1 is a perspective view showing an optical head according to an embodiment of the present invention.
Figure 2:
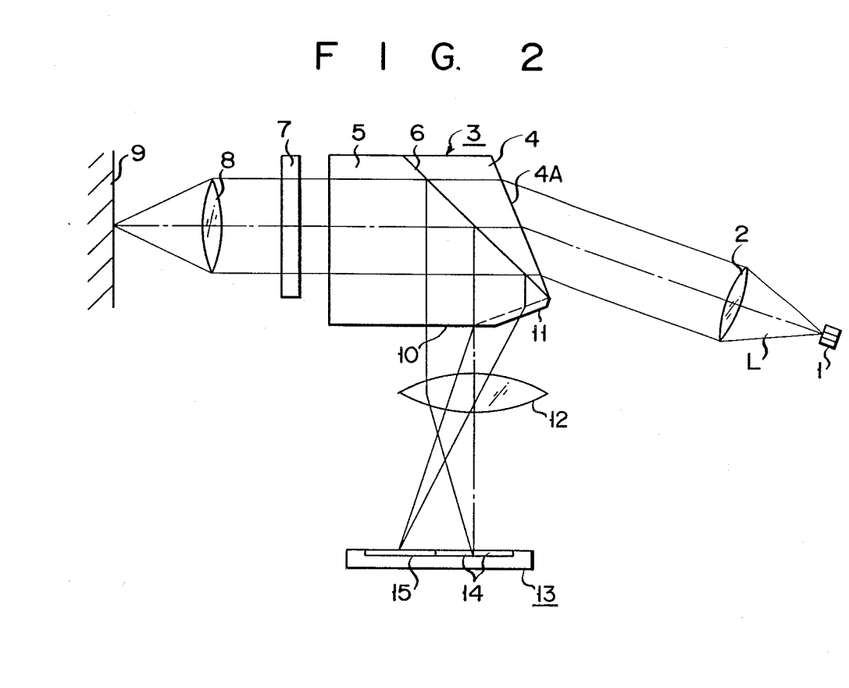
FIG. 2 schematically shows an arrangement of an optical system shown in FIG. 1.

As shown in FIGS. 1 and 2, divergent laser beam L is emitted from semiconductor laser 1, converted into a parallel beam by collimator lens 2, and projected on beam splitter 3. Splitter 3 includes two prisms 4 and 5 and polarizing surface 6 between the prisms. Incidence surface 4A of prism 4 is inclined, relative to the optical axis of lens 2. Thus, as laser beam L, emitted from laser 1, passes through surface 4A, its cross-section is changed from an elliptic shape to into a circular one.

Incident on beam splitter 3, laser beam L then passes through the splitter, and is reflected by reflecting surface 20A of total-reflection prism 20, thus changing its path. Light beam L, reflected from the surface 20A, passes through $\frac{1}{4}\lambda$ plate 7, to be guided to objective lens 8, and is then converged on information memory medium (hereinafter referred to simply as disk or optical disk) 9, such as an optical disk, optical card, etc., by lens 8. As is generally known, optical disk 9 is formed with a record film, as a light-reflecting film. Projection or recess tracking guide 9A is formed concentrically or spirally on the surface of the record film. Information is stored in guide 9A, in the form of changes of conditions, e.g., changes of reflection state.

Semiconductor laser 1 is driven by a driver circuit (not shown). In a reproducing mode, laser beam L with a predetermined luminous intensity is emitted from laser 1. In a recording mode, the emitted laser beam is intensity-modulated in accordance with the information to be recorded, so that the state or conditions of the record film are changed. In an erase mode, emitted laser beam L has a predetermined intensity higher than that in the reproducing mode, so that the state or conditions of the record film are changed in a like manner.

Laser beam L converged on optical disk 9 is reflected by the record film, to be returned to objective lens 8. When lens 8 is kept focused on disk 9, that is, when the beam waist of the light beam converged by lens 8 is formed on disk 9, the beam returned to lens 8 is converted into a parallel light beam by lens 8. The parallel beam is returned to beam splitter 3 through $\frac{1}{4}\lambda$ plate 7. As laser beam L reciprocates through plate 7, its plane of polarization is rotated 90°. Accordingly, beam L is reflected by polarizing surface 6, without passing through it again, to be directed to laser light-emerging surface 5A of prism 5 of beam splitter 3.

Figure 3:
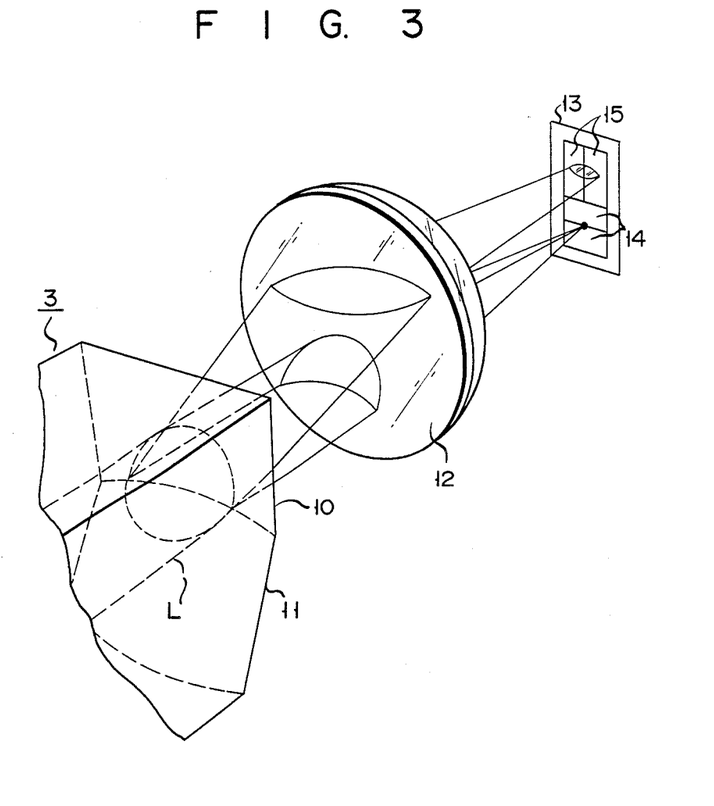
FIG. 3 is a partial enlarged view of the optical system of FIG. 1.

Laser light-emerging surface 5A is defined by first and second light beam-emerging surfaces 10 and 11. In this embodiment, as shown in FIG. 3, first surface 10 is a flat surface, while second surface 11 is an astigmatic surface or a semicylindrical concave-lens surface, which is inclined, relative to surface 10. According to the present invention, surface 10 need not always be a flat surface, surface 11 may be a spherical surface instead of cylindrical surface, and it is necessary only that surfaces 10 and 11 have different radii of curvature. Each of these radii of curvature may be a complex radius, as well as a single one. Thus, surfaces 10 and 11 may each be defined by a nonspherical surface. Moreover, surface 5A of prism 5 may be formed into flat and laser light-emitting surface 5B, which may be defined by a flat first surface and a second surface or astigmatic surface, in the form of a semicylindrical convex-lens surface inclined relatively to the flat surface.

Figure 4:
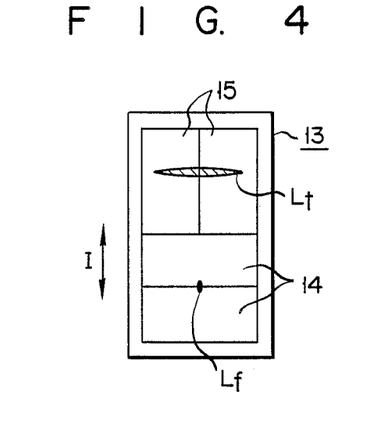
FIGS. 4, 5 and 6 are plan views showing a light receiving surface of a photodetector shown in FIG. 1, and light beam spots formed thereon.

The laser beam reflected by polarizing surface 6 is transmitted through flat surface 10 and concave-lens surface 11 to be split in two directions. Thereafter, the split beams are converged and projected on photodetector 13, having one light-receiving surface, by common projection lens 12. The light-receiving surface of photodetector 13 is substantially located so that the converging point or waist of laser beam L, transmitted through surface 10, is formed on or close to the light-receiving surface when objective lens 8 is in focus. Photodetector 13 has, on its light-receiving surface, a pair of photosensitive regions 14 for defocusing detection and another pair of photosensitive regions 15 for tracking-error detection. Regions 14 and 15 are separated from one another by photosensitive boundary regions. When lens 8 is in a focused state, laser beam L, transmitted through flat surface 10, is directed to the boundary region between regions 14, as shown in FIG. 4. When lens 8 is in defocusing state, beam L is directed to either of regions 14. As objective lens 8 moves along its optical axis, beam L is deflected in the direction of arrow I, so that a beam spot on the light-receiving surface of photodetector 13 is moved in the direction of arrow I, depending on the defocusing degree. Thus, the defocusing state is detected by the so-called knife-edge method. As laser beam L passes through concave cylindrical surface 11, the laser beam is expanded in a lateral direction. Since surface 11 has no lens effect in the direction perpendicular to its base axis, the laser beam is elongated in the perpendicular direction, and is converged on photosensitive regions 15 for tracking-error detection. In this manner, an elongated laser beam spot is formed on regions 15, as shown in FIG. 4. A far-field pattern of the tracking guide is formed in the elongated spot, so that tracking errors can be detected by processing signals from photosensitive regions 15, that is, by the so-called push-pull method. Also, the recorded information can be detected by processing the signals from regions 15.

According to the arrangement described above, photodetector 13 and projection lens 12 can each be one in number, so that the optical system is simple in construction, requiring only a relatively small number of components, and thus permitting reduction in size and weight.

Further, the laser beams for defocusing detection and tracking-error detection can be divided by only the two surfaces, i.e., first surface 10 and second surface or cylindrical concave-lens surface 11. Therefore, the optical system can be assembled and adjusted with ease, and the optical head can be manufactured at relatively low costs.

Figures 5, 6:
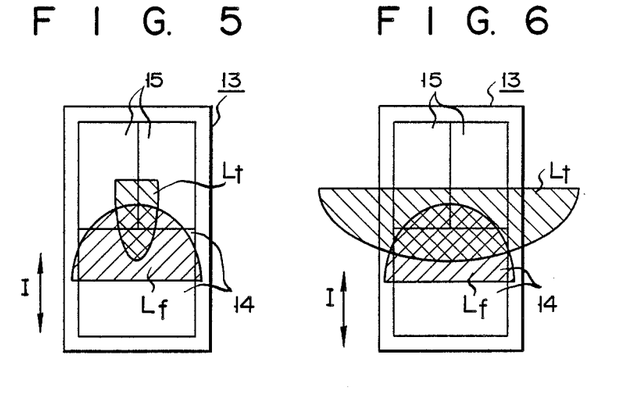

For the nonspherical curved surface, furthermore, semicylindrical concave-lens surface 11 is preferred to a semicylindrical convex-lens surface, as shown in FIG. 1. The reason is that the use of the concave surface leads to a substantial reduction of the influences of the laser beams, for defocusing detection and tracking-error detection, on each other. Referring now to FIGS. 4, 5 and 6, this point will be explained. If a semicylindrical lens surface, whether concave or convex, is used as second surface 11, laser beam spots Lf and Lt are formed on photodetector 13, as shown in FIG. 4, when objective lens 8 is in focus. If a semicylindrical convex-lens surface is used as the second surface, and when lens 8 is in a defocusing state such that it is located closer to optical disk 9 than when in focus, on the other hand, beam spot Lt for tracking-error detection becomes narrower, and partially enters photosensitive regions 14 for defocusing detection, as shown in FIG. 5. As a result, the levels of photoelectric signals from regions 14, responsive to defocusing detection characteristics and the degree of defocusing, provided by beam spot Lf for defocusing detection, are changed substantially. The influence of laser beam Lt for tracking-error detection depends on the distance between beams Lt and Lf when lens 8 is in focus. This distance is limited within a certain range, only due to restrictions on the manufacture of the optical head, and it is hard to keep the distance constant. If a semicylindrical concave-lens surface is used as second surface 11, and when objective lens 8 is in the aforesaid defocusing state, laser beam Lt for tracking-error detection becomes wider than in the focusing state, so that less light enters photosensitive regions 14 for defocusing detection. Thus, the influence of beam Lt on the defocusing detection characteristics can be reduced.

Figure 7:
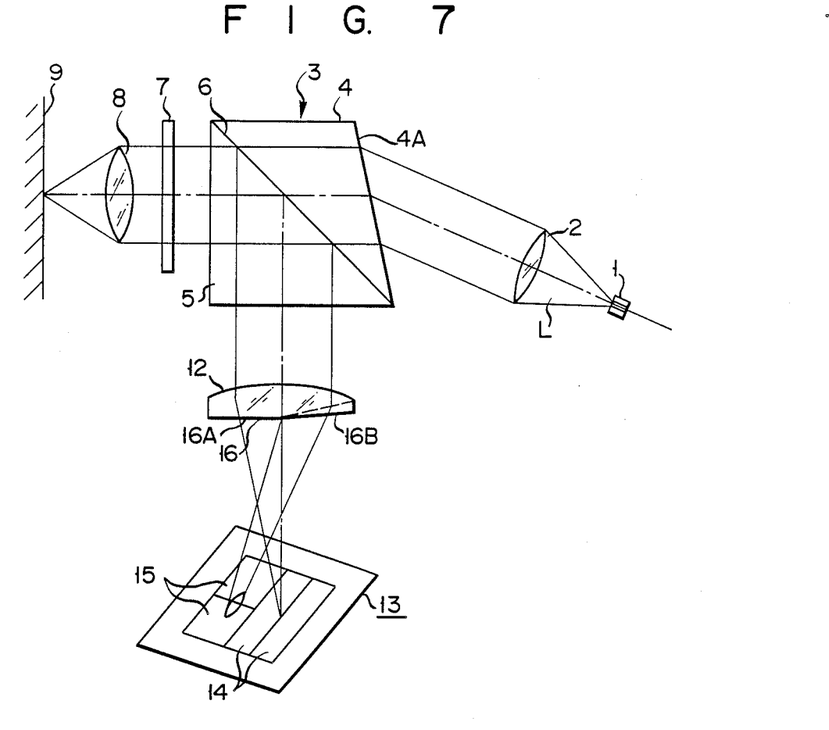
FIG. 7 schematically shows an arrangement of an optical system of an optical head according to another embodiment of the invention.
Figure 8:
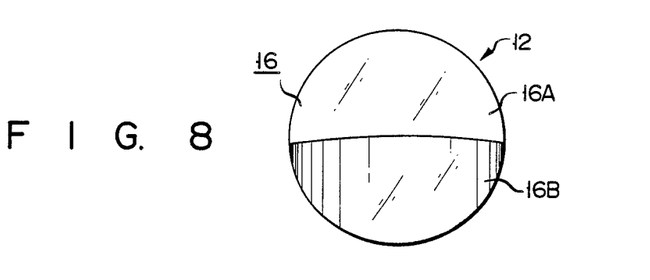
FIG. 8 is a plan view of a projection lens shown in FIG. 7.

FIGS. 7 and 8 shows a second embodiment of the present invention. In this embodiment, laser light-emitting surface 5A of prism 5 is formed as a single surface, instead of being defined by first and second light beam-emerging surfaces 10 and 11. Instead of surface 5A of prism 5, light emitting surface 16 of projection lens 12 is defined by flat surface 16A and concavelens surface 16B, as shown in FIG. 8, whereby a laser beam is separated. Thus, projection lens 12, which is formed by grinding part of a flat portion of a plain convex lens, has unground flat surface 16A and ground astigmatic surface 16B or semicylindrical concave-lens surface 16B, inclined relatively to surface 16A.

Figure 9:
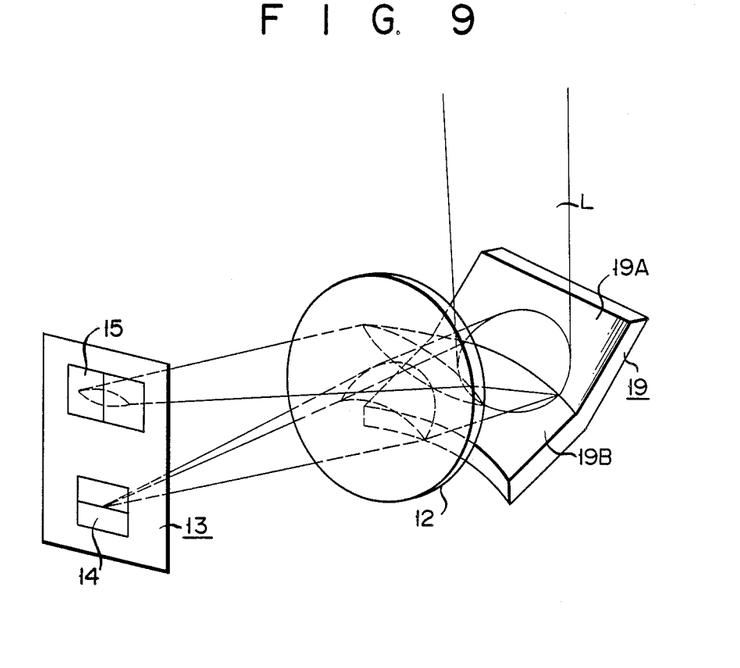
FIG. 9 is a perspective view showing part of an optical system of an optical head according to still another embodiment of the invention.

FIG. 9 shows a third embodiment of the present invention. In this embodiment, mirror 19, for use as a member for separating laser beam L, has flat mirror surface 19A and semicylindrical convex-mirror surface 19B, for reflecting beam L. The mirror is disposed between projection lens 12 and beam splitter 3.

In the optical system shown in FIGS. 7 and 8, like the one shown in FIGS. 1 and 2, a laser beam emerging from flat surfaces 16 and 19 is directed to photosensitive regions for focusing detection, while a laser beam emerging from the concave surface is directed to photosensitive regions for tracking-guide detection. In the regions for focusing detection, the focus is detected in accordance with the position of a beam spot formed in the regions. In the regions for tracking-guide detection, the tracking guide is detected by a far-field pattern formed in a beam spot. The present invention is not limited to the optical systems described above, and may be applied also to a magneto-optical disk system, as stated in U.S. Pat. Appl. Ser. No. 862,829, filed on May 13, 1984 (EPC Pat. Appl. No. 86106550-6, filed on May 14, 1984), by Ando.

In the optical systems described above, the optical components are fixed to a bonding surface of base frame 22 of a lens barrel. The bonding surface is located parallel to direction I, in which the laser beam is deflected when objective lens 8 moves along its optical axis. Thus, even if the optical axis is dislocated in the optical head, by a change of ambient temperature, the degree of defocusing can be prevented from being detected in a wrong manner. This point will now be described further in detail.

Base frame 22 of the lens barrel is formed from aluminum, in order to lighten the optical head in weight, while beam splitter 3 is made of glass (e.g., BK-7). Therefore, even though the optical axis can be adjusted correctly at normal temperature, it will possibly be dislocated at a high temperature, due to thermal distortion, caused by the difference in the coefficient of thermal expansion between aluminum and glass. In this case, if splitter 3 is bonded to frame 22 in a manner such that the plane of bonding between the two members extends at right angles to moving direction I of beam spots on photodetector 13, in the defocusing state, direction II of the dislocation of the optical axis, caused by thermal distortion, if any, will be parallel to direction I. Therefore, the direction of the dislocation of the optical axis, attributable to the difference in the coefficient of thermal expansion between splitter 3 and frame 22, is made perpendicular to the moving direction of beam spots on photodetector 13, obtained when the objective lens is not focused on the optical disk. Thus, splitter 3, prisms 20 and 5, and ¼λ plate 7, which are all made of glass, are bonded to one another as an integral structure. Resultant integral component 36 is bonded to aluminum base frame 22 in a manner such that one lateral face of each of spitter 3 and prism 20 is opposed to frame 22. The plane of bonding between component 36 and frame 22 extends parallel to moving direction I of beam spots on photodetector 13, obtained when objective lens 8 is out of focus.

According to the arrangement described above, if thermal distortion is caused between integral component 36 and base frame 22, component 36 rotates in direction II, and never in direction III. Accordingly, the dislocation of the optical axis, attributable to the difference in the coefficient of thermal expansion between glass component 36 and aluminum frame 22, occurs only in direction II, and not in direction III which is parallel to moving direction I of beam spots on photodetector 13, in the defocusing state. Thus, the optical axis can never be dislocated in direction III or I, so that the degree of defocusing cannot be detected in a wrong manner. In other words, defocusing can always be detected with high accuracy and reliability. Since direction II is perpendicular to direction I, moreover, wrong detection of defocusing degree cannot be entailed if the optical axis is dislocated in direction II.

What is claimed is:

1. An optical system for focusing a light beam onto an optical memory, comprising:

means for generating a light beam;

means for converging the generated light beam toward the optical memory, said converging means having an optical axis and being movable along the optical axis, the generated light beam being focused on the optical memory when said converging means is in a focusing state, and the light beam being defocused on the optical memory when said converging means is in a defocusing state;

means for guiding a light beam reflected from the optical memory and for separating the reflected light beam into first and second light beams, said reflected light beam guiding and separating means including first and second light beam emerging surfaces having different radii of curvature, the first and second light beams emerging from the emerging surfaces along first and second optical paths, respectively;

means for detecting one of the first and second light beams to generate a focusing signal which indicates whether said converging means is in the focusing state or in the defocusing state; and means for driving said converging means in response to the focusing signal to maintain said converging means in the focusing state.

2. The optical system according to claim 1, wherein said detecting means includes a first pair of photosensitive regions for sensing the one light beam, the first and second light beams emerging from the emerging surface of said separating means converge at predetermined different convergent points, and the first pair of photosensitive regions are located on one of the convergent points.

3. The optical system according to claim 1, wherein said converging means includes an objective lens.

4. The optical system according to claim 1, wherein said guding and separating means includes a beam splitter for guiding the light beam from said generating means to the optical memory and for guiding the light beam from the optical memory to said detecting means.

5. The optical system according to claim 1, wherein said guiding and separating means includes a prism including the first and second light beam emerging surfaces.

6. The optical system according to claim 1, wherein said guiding and separating means includes a convergent lens having the first and second light beam emerging surfaces for converging the first and second light beams toward different convergent points.

7. The optical system according to claim 1, wherein said guiding and separating means includes a mirror having the first and second light beam emerging surfaces for separating the light beam into the first and second light beams and for reflecting the first and second light beams.

8. The optical system according to claim 1, wherein the first light beam emerging surface is a substantially flat surface and the second light beam emerging surface is a substantially concave surface.

9. The optical system according to claim 1, wherein the second light beam emerging surface is a concave cylindrical surface.

10. The optical system according to claim 1, wherein said detecting means has a first pair of photosensitive regions for sensing the one light beam and a photoinsensitive region arranged between the photosensitive regions.

11. The optical system according to claim 10, wherein the one light beam is guided to the photoinsensitive region when said converging means is in the focusing state, and the one light beam is guided to one of the photosensitive regions when said converging means is in the defocusing state.

12. The optical system according to claim 10, wherein the first pair of photosensitive regions and the photoinsensitive region are arranged in a first direction.

13. The optical system according to claim 12, further comprising:
means for holding the beam splitter, said holding means having a surface to which the beam splitter is bonded and which is substantially parallel to said first direction.

14. An optical system for tracing the tracking guide of an optical memory, comprising:
means for generating a light beam;
means for converging the generated light beam toward the optical memory and directing the light beam to the tracking guide of the optical memory, the light beam tracing the tracking guide when said converging means is in an on-tracking state, said converging means being movably suspended for selectively changing the direction of the light beam;
means for guiding the light beam from the optical memory and for separating the light beam into first and second light beams, said light beam guiding means including first and second light beam emerging surfaces having different radii of curvature, the first and second light beams traversing in first and second optical paths, respectively;
means for detecting one of the first and second light beams to generate a tracking signal which indicates whether said converging means is in the on-tracking state or in the off-tracking state; and
means for driving said converging means in response to the tracking signal to maintain said converging means in the on-tracking state.

15. The optical system according to claim 14, wherein said detecting means has a first pair of photosensitive regions for sensing tee one light beam, wherein the first and second light beams emerging from the emerging surface of said separating means are converging along different optical paths to first and second focal planes, respectively, and wherein the first pair of photosensitive regions are located along said first optical path.

16. The optical system according to claim 14, wherein said detecting means has a first pair of photosensitive regions for sensing the one light beam and a photoinsensitive region arranged between the photosensitive regions.

17. The optical system according to claim 16, wherein the first pair of photosensitive regions and the photoinsensitive region are arranged in a first direction.

18. The optical system according to claim 17, further comprising:
means for holding the beam splitter, said holding means having a surface to which the beam splitter is bonded and which is arranged perpendicularly to the first direction.

19. An optical system for focusing a light beam onto an optical memory and tracing a tracking guide thereof, comprising:
means for generating a light beam;
means for converging the generated light beam onto the optical memory and directing the light beam to the tracking guide, which has an optical axis, is movable along the optical axis, and is movably suspended to change the direction of the light beam, the light beam being focused on the optical memory when said converging means is in a focusing state, and the light beam being defocused on the optical memory when said converging means is in a defocusing state, the light beam tracing the tracking guide when said converging means is in an on-tracking state, and the light beam mis-tracing the tracking guide when said converging means is in an off-tracking state;
means for guiding said light beam from the optical memory and separating the light beam into first and second light beams, said light beam guiding means including first and second light beam emerging surfaces having different radii of curvature, said first and second light beams traversing first and second optical paths, respectively;
means for detecting said first light beam to generate a focusing signal which indicates whether said converging means is in the focusing state or in the defocusing state, and detecting said second light beam to generate a tracking signal which indicates whether said converging means is in the on-tracking state or in the off-tracking state; and
means for driving said converging means in response to the focusing signal and tracking signal to maintain said converging means in the focusing state and in the on-tracking state.

20. The optical system according to claim 19, wherein said detecting means has a first pair of photosensitive regions and a first photoinsensitive region arranged therebetween, said first pair of photosensitive regions and said first photoinsensitive region being oriented in a first direction, and a second pair of photosensitive regions and a second photoinsensitive region arranged therebetween, said second pair of photosensitive regions and said second photoinsensitive regions being oriented in a second direction perpendicular to said first direction, said frist and second light beams converging to first and second focal planes, respectively, wherein the first pair of photosensitive regions are located along said first optical path and wherein the second pair of the photosensitive regions are located along said second optical path.

* * * * *